United States Patent
Meyer et al.

(12) 
(10) Patent No.: US 6,461,244 B2
(45) Date of Patent: Oct. 8, 2002

(54) CONSTANT VELOCITY FIXED JOINT WITH IMPROVED CAGE ASSEMBLY

(75) Inventors: Erik Harry Meyer, Chesterfield; Joachim H. Proelss, Rochester Hills, both of MI (US)

(73) Assignee: GKN Automotive, Inc., Auburn Hills, MI (US)

(*) Notice: Subject to any disclaimer, the term of this patent is extended or adjusted under 35 U.S.C. 154(b) by 0 days.

(21) Appl. No.: 09/785,874

(22) Filed: Feb. 16, 2001

(65) Prior Publication Data
US 2001/0046901 A1 Nov. 29, 2001

Related U.S. Application Data
(60) Provisional application No. 60/183,598, filed on Feb. 18, 2000.

(51) Int. Cl.[7] .............................................. F16D 3/224
(52) U.S. Cl. .................. 464/145; 464/906; 29/898.065
(58) Field of Search .............................. 464/145, 906; 29/898.065, 898.067

(56) References Cited

U.S. PATENT DOCUMENTS

| | | |
|---|---|---|
| 1,916,442 A | 7/1933 | Rzeppa |
| 3,982,840 A | 9/1976 | Grosseau |
| 4,611,373 A * | 9/1986 | Hazebrook .............. 464/145 X |
| 5,509,857 A | 4/1996 | Flaugher |
| 5,599,234 A * | 2/1997 | Harz et al. ................ 464/145 |
| 5,885,162 A | 3/1999 | Sakamoto et al. |
| 6,132,316 A | 10/2000 | Statham |

FOREIGN PATENT DOCUMENTS

| | | | |
|---|---|---|---|
| GB | 847569 | 9/1960 | |
| GB | 978230 | * 12/1964 | ................. 464/145 |

* cited by examiner

*Primary Examiner*—Greg Binda

(57) ABSTRACT

The invention relates constant velocity fixed universal joints A fixed constant-velocity ratio universal joint, comprising an outer joint part, an inner joint part, a ball cage and a plurality of balls. The ball cage is disposed between the inner and outer joint parts and includes windows in which respective balls are received and constrained such that their centers lie in a common plane. At least two opposing windows are wider than said outer joint part lands to accommodate receiving the lands during assembly. The cage includes substantially spherical inner and outer surfaces which engage the land surfaces on the inner and outer joint parts respectively. The ball cage also includes a relief groove between at least one pair of adjacent windows thereby providing a reduced circumference for the ball cage outer surface in the region of the groove. The groove is at least as wide as one of the outer joint part lands to accommodate introduction of the ball cage into the outer joint part when the ball cage is rotated about a transverse axis by 90° with respect to the outer joint part axis during assembly.

15 Claims, 3 Drawing Sheets

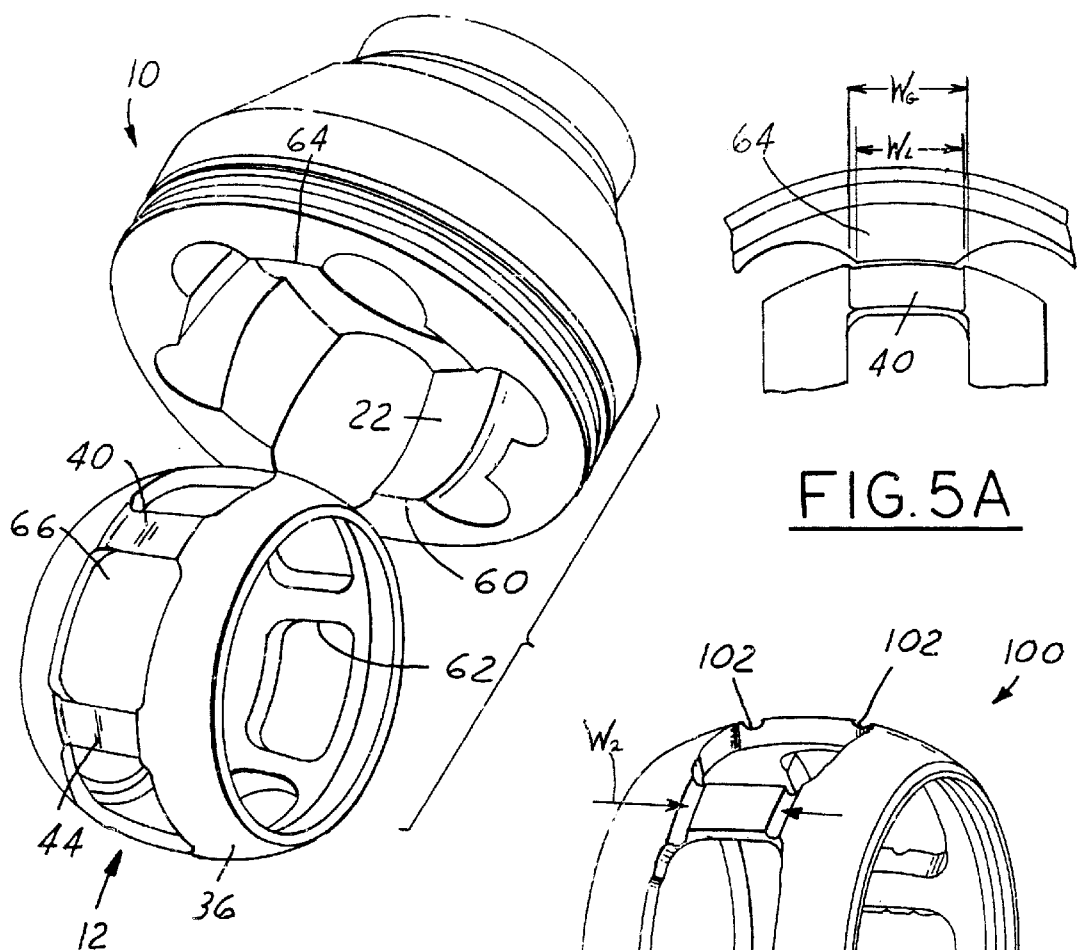

CONSTANT VELOCITY FIXED JOINT WITH IMPROVED CAGE ASSEMBLY

RELATED APPLICATIONS

This application claims the benefit of U.S. Application Ser. No. 60/183,598 filed Feb. 18, 2000, entitled "Constant Velocity Fixed Joint Cage Installation Grooves."

BACKGROUND OF THE INVENTION

The present invention relates to constant velocity fixed universal joints and, in particular, concerns a constant velocity fixed joint of the type comprising: (1) an outer joint member of hollow configuration, having a rotational axis and in its interior, a plurality of arcuate tracks circumferentially spaced about the axis extending in meridian planes relative to the axis, and forming lands between the tracks and integral with the outer joint part wherein the lands have radially inwardly directed surfaces; (2) an inner joint member disposed within the outer joint member and having a rotational axis, the inner joint member having on its exterior a plurality of tracks whose centerline lie in meridian planes with respect to the rotational axis of the inner joint member in which face the tracks of the outer joint member and opposed pairs, wherein lands are defined between the tracks on the inner joint member and have radially outwardly directed surfaces; (3) a plurality of balls disposed one in each pair of facing tracks in the outer and inner joint members for torque transmission between the members; and (4) a cage of annular configuration disposed between the joint members and having openings in which respective balls are received and constrained so that their centers lie in a common plane, wherein the cage has external and internal surfaces each of which cooperate with the land surfaces of the outer joint member and inner joint member, respectively, to locate the cage and the inner joint member axially.

In joints of this kind, the configuration of the tracks in the inner and outer joint members, and/or the internal and external surfaces of the cage are such that, when the joint is articulated, the common plane containing the centers of the balls substantially bisects the angle between the rotational axes of the joint members.

There are several types of joint of the kind specified differing from one another, inter alia, with respect to the arrangement and configuration of the tracks in the joint members and/or to the internal and external surfaces of the cage whereby the common bisector plane is guided as described above thereby giving the joint constant-velocity-ratio operating characteristics. What such different types of joints have in common, however, is that the cage is located axially in the joint by cooperation between the external cage surface and the surfaces of the lands facing the cage surface.

The outer surface of the cage and cooperating land surfaces of the outer joint member are generally spherical. When torque is transmitted by the joint, the forces acting in the joint cause the cage to be urged towards one end of the joint (i.e. ball expulsion forces); which end will depend on the respective directions of the offsets of the tracks in the inner and outer joint members from the common plane when the joint is in its unarticulated position To reduce the normal forces acting on the cage as a result of these ball expulsion forces, the amount of spherical wrap by the outer joint member lands should be maximized for increased cage support. However, the more the outer joint part lands spherically enclose the spherical outer surface of the cage, the more difficult the introduction of the ball cage into the outer joint part becomes. In a disc-style constant velocity fixed joint wherein the outer joint member is open on both ends, the cage is assembled from the end opposite the end towards which the cage is urged by ball expulsion forces under articulated load conditions. Assembly of the cage into the outer joint member is typically accomplished by either incorporating cage assembly notches into one of or a pair of lands in the outer joint member, or by sufficiently increasing the bore diameter of the outer joint part to allow the ball cage to be introduced into the outer joint part.

In a mono-block constant velocity fixed joint wherein the outer joint part is a bell-shaped member having a closed end, the cage must be assembled from the open end of the outer joint member. To accommodate assembly of the cage into the outer joint part, again, the bore diameter of the outer joint part must be sufficiently increased to allow assembly and/or assembly notches must be incorporated into at least one opposing pair of the outer joint member lands to allow introduction of the cage. Either method is undesirable however in that both assembly methods reduce the amount of spherical wrap available for cage support. In turn, higher surface stresses are induced to the cooperating surfaces of the outer joint part and the cage resulting in greater heat generation due to increased friction.

SUMMARY OF THE INVENTION

Accordingly, it is an object of the present invention to provide a constant velocity fixed joint with an improved cage assembly. According to the present invention, the foregoing and other objects are obtained by a fixed constant-velocity-ratio universal joint, comprising an outer joint part, an inner joint part, a ball cage and a plurality of balls. The outer joint part has a hollow configuration and includes a rotational axis, a plurality of at least partially arcuate tracks circumferentially spaced about the axis in the interior of the outer joint part and having center lines extending in meridian planes relative to the axis, and lands defined between the tracks and which are integral with the outer joint part and have inwardly directed surfaces. The inner joint part is disposed within the outer joint part and includes a rotational axis, a plurality of at least partially arcuate tracks on the exterior of the inner joint part having center lines extending in meridian planes with respect to the rotational axis of the inner joint part and which faces the tracks in the outer joint part in opposed pairs, and lands defined between the tracks on the inner joint part having radially-outwardly directed surfaces. The plurality of balls are disposed one in each pair of facing tracks in the outer and inner joint parts for torque transmission between the parts. The ball cage is disposed between the inner and outer joint parts and includes windows in which respective balls are received and constrained such that their centers lie in a common plane. At least two opposing windows are wider than the outer joint part lands to accommodate receiving the lands during assembly. The cage includes substantially spherical inner and outer surfaces which engage the land surfaces on the inner and outer joint parts respectively.

The ball cage also includes a relief groove between at least one pair of adjacent windows thereby providing a reduced circumference for the ball cage outer surface in the region of the groove. The groove is at least as wide as one of the outer joint part lands to accommodate introduction of the ball cage into the outer joint part when the ball cage is rotated about a transverse axis by 90° with respect to the outer joint part axis. In one aspect of the invention, the groove is an annular groove about the circumference of the cage outer surface. In another aspect of the invention, the groove comprises two grooves centered about the central ball plane of the cage and corresponding to the outer joint part land width.

One advantage of the present invention is that it maximizes the spherical wrap of the outer joint member lands with respect to the outer surface of the cage. Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 5 shows a perspective axial view of an outer joint part and ball cage according to FIG. 4.

FIG. 5A shows a detail of an outer joint part and the cage of FIG. 5 during assembly.

FIG. 6 shows a perspective view of an alternative embodiment of a cage according to the present invention.

FIG. 7 shows a detail of an outer joint part and the cage of FIG. 6 during assembly.

DESCRIPTION OF THE INVENTION

Figure 1:
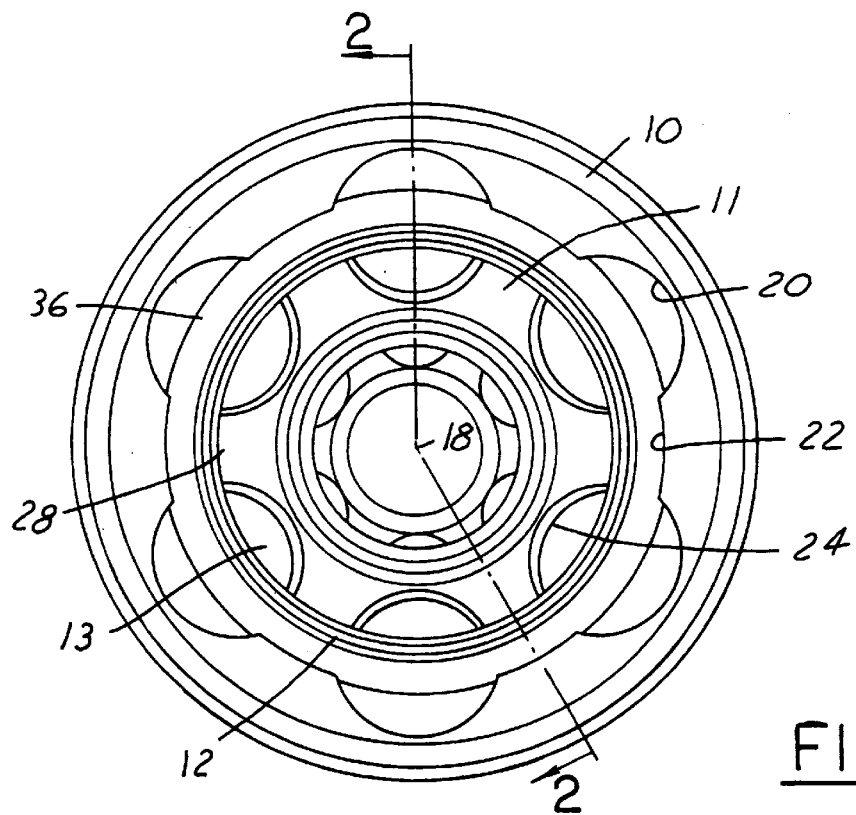
FIG. 1 is an end view of a constant velocity fixed joint according to one embodiment of the present invention taken in the direction of arrow A in FIG. 2.
Figure 2:
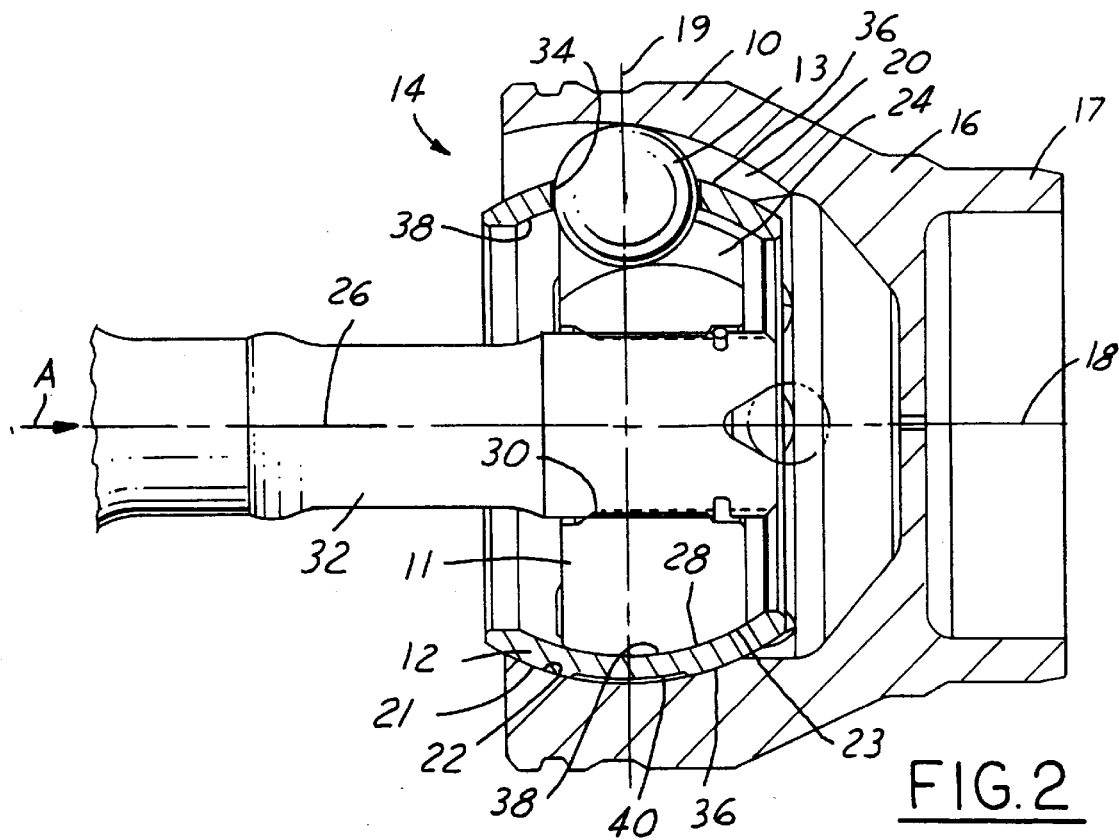
FIG. 2 is a longitudinal section view of the joint of FIG. 1 taken along line 2-2.

FIGS. 1 and 2 will be described jointly. FIG. 1 is an end view of a constant velocity fixed joint according to one embodiment of the present invention taken in the direction of arrow A of FIG. 2. FIG. 2 is a longitudinal section through the joint of FIG. 1 along line 2—2 of FIG. 1. The principal components of the fixed joint are an outer joint member 10, an inner joint member 11, a cage 12, and a plurality of torque-transmitting balls 13.

The outer joint member 10 is a hollow bell-shaped component having an open end 14 and a closed end 16 from which a stub shaft 17 extends. The axis of rotation of the outer joint member 10 is indicated at 18. In the interior of the outer joint member 10, there is a number of circumferentially spaced arcuate tracks 20 which are equally angularly spaced about the joint member axis 18 and whose centerlines lay in meridian planes containing the axis 18. Between the outer joint member tracks 20, there are defined lands 22 which are integral with the joint member and have radially inwardly directed surfaces. The closed end 16 of the outer joint member 10 can be either integrally formed as part of the outer joint member or comprise a welded-on-base.

The inner joint member 11 is provided on its exterior surface with a number of arcuate tracks 24 whose centerlines lie in meridian planes containing the inner joint member axis of rotation 26 which, when the joint is in the aligned, i.e. non-articulated, condition illustrated, is coincident with the axis 18. The tracks 24 face the tracks 20 in opposed pairs. Between the tracks 24, the inner joint member has lands 28 which are integral with the inner joint member 11 and have radially outwardly directed surfaces. Inner joint member 11 is a cylindrical component having a splined bore 30 for torque-transmitting reception of a drive shaft 32. Of course, the inner joint member 11 and driveshaft may be integral parts, or connected by means other than a spline such as a weld.

In the longitudinal cross-section shown in FIG. 2, the tracks 20, 24 are arcuate in configuration and the centers of curvature of such arcs are offset from one another axially with respect to the joint so that the tracks of each pair diverge from one another as they approach the open end 14 of the outer joint member 10. Each pair of opposed tracks 20, 24 receives a respective torque-transmitting ball 13. The centers of the balls 13 lie in a common plane 19. The offset configuration of the tracks 20, 24 in the joint members 10, 11 is such that, in a known manner, when the joint is articulated, the common plane 19, i.e. the bisector plane in FIG. 2, is caused to bisect the angle between the rotational axes 18, 26 of the outer and inner joint members 10, 11, respectively, thereby giving the joint constant-velocity-ratio characteristics.

The cage 12 is an annular component innerposed between the inner joint member 11 and outer joint member 10. It has a plurality of openings or windows 34 respectively receiving the balls 13 so that the centers of the balls lie in the common plane 19.

The cage has a generally spherical external surface 36 which contacts the radially inwardly facing surfaces of the lands 22 between the tracks 20 of the outer joint member 10. The cage also has a generally spherical internal surface 38 engageable with the radially-outwardly facing surfaces of the lands 28 between the tracks 24 of the inner joint member 11.

When the joint is in use, forces acting on the balls and, in turn, on the cage, urge the cage 12 towards the open end 14 of the outer joint member 10. Thus, the cage outer surface 36 bears on the facing surf aces of the outer joint member lands 22 primarily in the area 21 immediately adjacent the open end 14 of the outer joint member 10. In the joint shown, the offset of the tracks in the inner joint member 11 is towards the closed end 16 of the outer joint member 10 and the offset of the tracks in the outer joint member 10 is towards the open end 14 of the outer member 10. Thus, the cage inner surface 38 bears on the facing surfaces of the inner joint member lands 28 primarily in the area 23 immediately adjacent the closed end 16 of the outer joint member 10. However, the direction of the offsets of the tracks 20, 24 can be reversed which would change the location of the contacting surface portions of the cage outer surface 36 and cage inner surface 38 to opposite positions.

The surfaces of the lands 22, 28 are preferably part-spherical, forming parts of a sphere centered on the axis of rotation 18 of the outer joint member 10 or the inner member 11, respectively. However, the land surfaces may be formed surfaces of revolution of a circular arc about said axes but with the arc not being centered on the axis. In another arrangement, the arc is not circular. The land surfaces could be alternatively formed by surfaces of revolution of an arc, which is preferably but not necessarily circular, about an axis of revolution offset from said axes 18, 26, the locus of the axis of revolution, when considering all the land surfaces, being a circle around the axis of rotation. As will be clear to one skilled in the art, any departure of the land surfaces from true part-spherical surfaces centered on the axes 18, 26 will be small.

In the embodiment of the invention shown in FIGS. 1 and 2, the cage outer surface 36 is relieved as indicated at 40. The relief 40 is in the form of a radial groove about the equator of the cage 12. The groove 40 extends in width on both sides of the ball plane 19 and is centered on the ball plane 19 as shown in FIG. 2.

Figure 3:
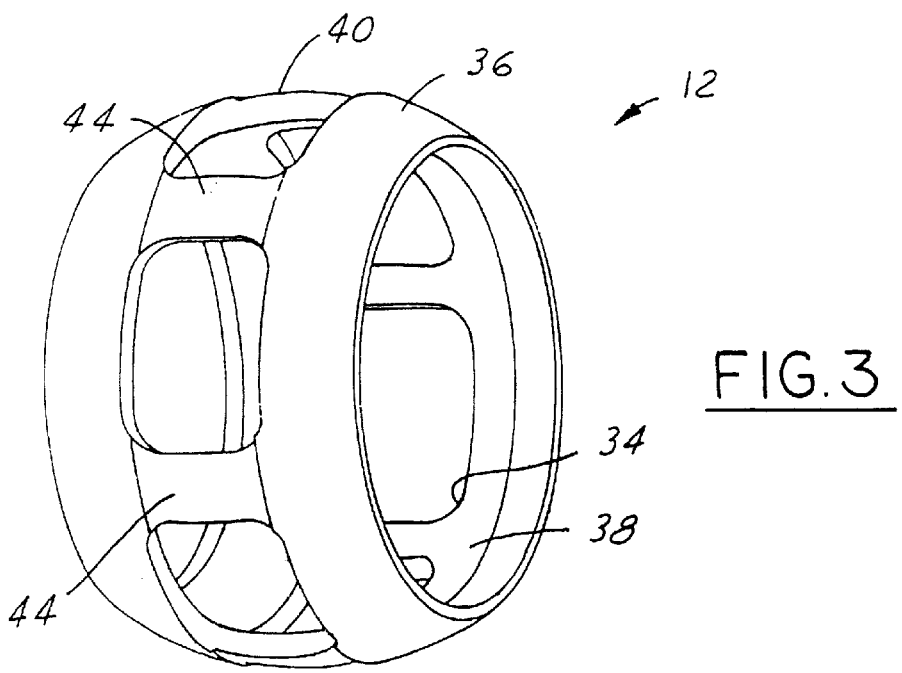
FIG. 3 shows a perspective view of a cage member according to one embodiment of the present invention.

Referring now to FIG. 3, there is shown a perspective view of the cage 12 of FIGS. 1 and 2. The cage 12 shown in FIG. 3 includes six windows 34 for accommodating respective balls. Between each window 34 is a web portion 44 in which the groove 40 is formed to reduce the maximum circumference of the cage outer surface to aid in the introduction of the cage into the outer joint member. Although the groove 40 is shown extending around the entire circumference of the cage 12, its benefits can be realized by merely reducing the thickness of one web portion 44 rather than all. For manufacturing purposes and for balance, however, it may be preferable to form the groove 40 about the entire circumference by roll-forming or turning the cage.

Figure 4:
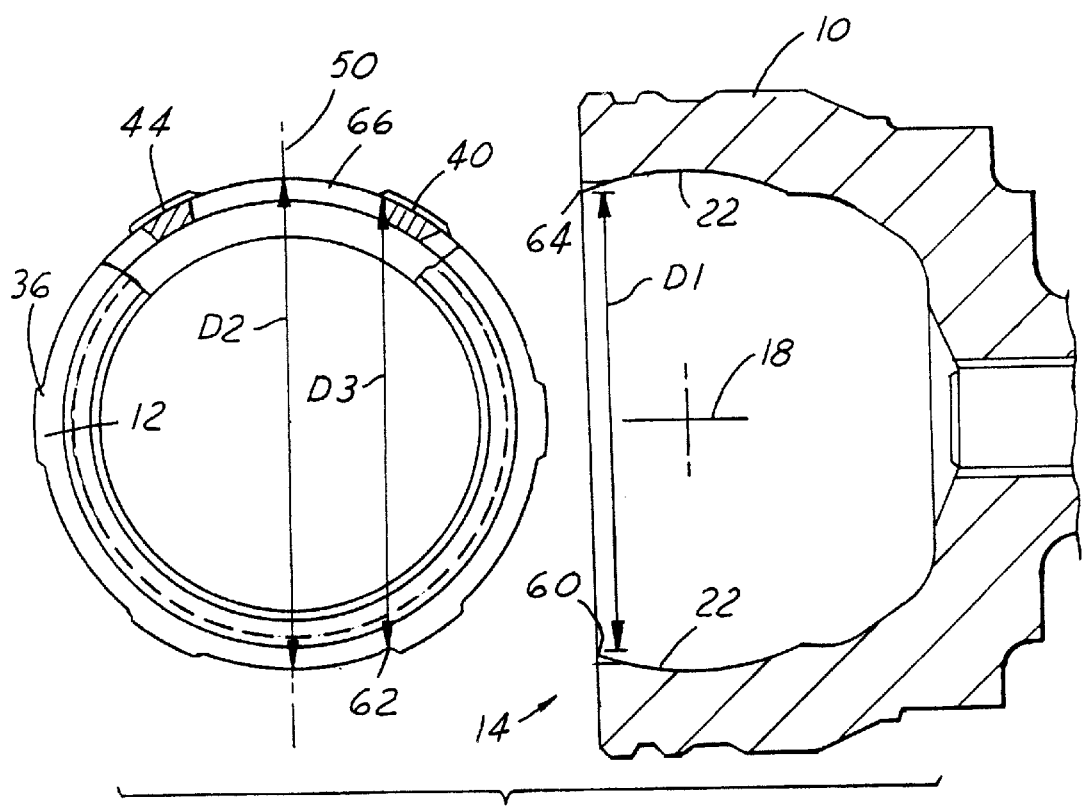
FIG. 4 shows a longitudinal section of an outer joint part through the longitudinal axis of the outer joint part and a cage according to one embodiment of the present invention during assembly.

FIG. 4 shows a longitudinal sectional view of the outer joint part 10 and an axial view of the cage 12, in part section, during assembly. Thus, the ball cage 12 is shown in a position in which it is rotated about one of its transverse axes 50 by 90° and displaced along its axis from the central axis 18 of the outer joint part. The outer joint part lands 22 comprise the guiding face for the spherical outer surface 36 of the ball cage 12. The outer surface 36 of the ball cage 12 is interrupted by the windows 34 and the groove 40.

As mentioned above, preferably the spherical wrap of the outer joint part lands 22 is maximized with respect to the spherical outer surface 36 of the cage 12 to maximize cage support during operation. The greater the spherical wrap, however, the smaller the bore diameter $D_1$ defined by the opening formed by opposing lands 22 in the outer joint part 10. The relationship between the bore diameter opening $D_1$ of the lands 22 and the diameter of the ball cage $D_2$, is such that $D_2$ is greater than $D_1$. For this reason, the cage 12 cannot be axially inserted into the outer joint part 10. Thus, for assembly purposes, an edge 60 of a land 22 is introduced into the forward portion 62 of one of the cage windows 34, and the ball cage 12 is introduced into the outer joint part 10 while carrying out a displacing or rotating movement such that the opposing edge 64 is introduced into the opposing cage window 66. Thus, the groove 40 acts to reduce the distance $D_3$ such that $D_3$ is less than $D_1$ thereby allowing introduction of the cage 12 into the outer joint part 10. Once the cage 12 enters the outer joint part aperture 14, it is returned onto the central axis 18 of the outer joint part by rotating the cage around its transverse axis 50 by 90° and translating the cage 12 with respect to the outer joint part 10 along the outer joint part axis 18. Subsequently, the inner joint part and balls are assembled in a known matter. In order to receive the land edges 60, 64 into the cage windows 62, 66, however, the window width must be greater than the land width.

Referring now to FIG. 5, there is shown a perspective view of the cage with respect to the outer joint part during the assembly process. During the assembly process, the rotational axis of the cage is transverse to the rotational axis of the outer joint part. Again, the opening 60 of a land 22 is introduced into the forward portion 62 of a cage window and the opposing cage window 66 is then moved toward the outer joint part 10 such that the opposing opening 64 passes the web portion 44 having its thickness reduced by the groove 40 and is introduced into the cage window 66. At that point, the cage can be advanced along the central axis of the outer joint part and rotated about its transverse axis to bring the lands 22 into contact with the spherical outer surface 36 of the cage 12. FIG. 5A shows a detail of the relationship between the groove 40 and land edge 64 during introduction of the cage into the outer joint part. As can be seen in FIG. 5A, the width $W_L$ of the land edge 64 is less than the width $W_g$ of the groove 40.

Referring now to FIG. 6, there is shown a perspective view of an alternative embodiment of a cage for use in a fixed constant velocity joint according to the present invention. The cage 100 of FIG. 6 include relief portions 102 which permit the cage 100 to be introduced into an outer joint part between opposing lands as shown in FIG. 7. FIG. 7 is a detail of an outer joint part 110 and the cage 100 of FIG. 6 during assembly. As shown in FIG. 7, the grooves 102 allow the points 104 defining the width of the land 122 to be introduced into the cage window 134 opposing the cage window containing the opposing land member (not shown). As shown in Figure,7 and FIG. 5, the width of the groove 40 or the spacing between centers of the relieved portions 102 ($W_2$ shown in FIG. 6) must be greater than the width $W_L$ of the lands to allow introduction of the lands into the cage window 134.

From the foregoing, it can be seen that there has been brought to the art a new and improved constant velocity fixed joint. While the invention has been described in connection with one or more embodiments, it will be understood that the invention is not limited to those embodiments. For example, the improved cage design is equally applicable to constant velocity fixed joints having four ball pairs rather than three. The improved cage design is also applicable to disc-style constant velocity fixed joints wherein the outer joint part is open at both ends. Thus, the invention covers all alternatives, modifications, and equivalents as may be included within the spirit and scope of the appended claims.

What Is claimed is:

1. A fixed constant-velocity-ratio universal joint, comprising:

an outer joint part of hollow configuration having a rotational axis, a plurality of at least partially arcuate tracks circumferentially spaced about said axis in the interior of the outer joint part and having center lines extending in meridian planes relative to the axis, and lands defined between said tracks and which are integral with the outer joint part and have inwardly directed surfaces;

an inner joint part disposed within the outer joint part and having a rotational axis, a plurality of at least partially arcuate tracks on the exterior of the inner joint part having center lines extending in meridian planes with respect to the rotational axis of the inner joint part and which faces the tracks in the outer joint part in opposed pairs, and lands defined between the tracks on the inner joint part having radially-outwardly directed surfaces;

a plurality of balls disposed one in each pair of facing tracks in the outer and inner joint parts for torque transmission between the parts; and a unitary ball cage disposed between the inner and outer joint parts and having windows in which respective balls are received and constrained such that their centers lie in a common plane, at least two opposing windows being wider than said outer joint part lands to accommodate receiving said lands during assembly, the cage having substantially spherical inner and outer surfaces which engage the land surfaces on the inner and outer joint parts respectively, wherein the ball cage includes a relief groove between at least one pair of adjacent windows thereby providing a reduced circumference for said ball cage outer surface in the region of said groove, said groove being wider than one of said outer joint part lands to accommodate introduction of the ball cage into said outer joint part when the ball cage is rotated about a transverse axis by 90° with respect to said outer joint part axis.

2. A fixed constant-velocity-ratio universal joint according to claim 1 wherein the outer joint part is a bell-shaped housing having a closed base and an aperture for receiving said inner part, ball cage and balls.

3. A fixed constant-velocity-ratio universal joint according to claim 2 wherein the outer joint part comprises a base which is integrally formed on and positioned opposite the aperture.

4. A fixed constant-velocity-ratio universal joint according to claim 3 wherein the arcuate tracks forming each opposing pair of arcuate tracks diverge from on another as they approach said aperture of said outer joint part.

5. A fixed constant-velocity-ratio universal joint according to claim 1 wherein said relief groove comprises two annular grooves centered about said common plane of said ball cage and wherein a distance between said two annular grooves is greater than the width of said outer joint part lands.

6. A fixed constant-velocity-ratio universal joint according to claim 1 comprising six balls.

7. A fixed constant-velocity-ratio universal joint according to claim 1 wherein said relief groove comprises an annular groove centered on said common plane of said ball cage and having a width substantially equal to a width of said cage windows.

8. A fixed constant-velocity-ratio universal joint comprising:

an outer joint part forming a bell-shaped member including a rotational axis, a base, an aperture and outer ball tracks;

an inner joint part forming a hub including inner ball tracks; and a unitary ball cage positioned between the outer joint part and inner joint part and comprising circumferentially distributed cage windows each of said windows adapted to receive a ball, said cage windows holding the balls in one plane defining a central plane of the ball cage;

wherein the inner and outer ball tracks form track pairs adapted to receive a torque transmitting ball;

wherein the outer joint part comprises a substantially internally spherical guiding face for the ball cage, the ball cage comprises an externally spherical outer surface which is in sliding contact with the guiding face; and wherein the ball cage includes a relief groove between at least one pair of adjacent windows, said groove centered on said central plane of the ball cage, said groove being wider than an area between adjacent outer ball tracks of said outer joint part to accommodate introduction of the ball cage into said outer joint part when the ball cage is rotated about a transverse axis by 90° with respect to said outer joint part axis.

9. A fixed constant-velocity-ratio universal joint according to claim 8 wherein said relief groove comprises an annular groove centered on said common plane of said ball cage and having a width substantially equal to a width of said cage windows.

10. A fixed constant-velocity-ratio universal joint according to claim 8 wherein said relief groove comprises two annular grooves centered on said common plane of said ball cage and wherein the distance between the centers of said grooves is greater than the width of an area between adjacent outer ball tracks of said outer joint part.

11. A fixed constant-velocity-ratio universal joint according to claim 8 comprising six balls.

12. A fixed constant-velocity-ratio universal joint according to claim 8 wherein the inner and outer tracks which form track pairs diverge from each other as they approach the aperture of the outer joint part.

13. A fixed constant-velocity-ratio universal joint according to claim 8 wherein the base is integrally formed on and positioned opposite the aperture.

14. A fixed constant-velocity-ratio universal joint according to claim 8 wherein the base is fixed to a housing and positioned opposite the aperture.

15. A method of assembling a fixed constant-velocity-ratio universal joint wherein the joint comprises:

an outer joint part forming a bell-shaped member including a rotational axis, a base, an aperture and outer ball tracks;

an inner joint part forming a hub including inner ball tracks forming track pairs with said outer ball tracks;

a unitary ball cage positioned between the outer joint part and inner joint part and comprising circumferentially distributed cage windows each of said windows adapted to receive a ball, said cage windows holding the balls in one plane defining a central plane of the ball cage; and a plurality of balls disposed one in each pair of facing tracks in the outer and inner joint parts for torque transmission between the parts;

the method comprising:

providing an annular relief groove centered on said central plane of the ball cage, said groove being wider than an area between adjacent outer ball tracks of said outer joint part;

positioning said ball cage rotated about a transverse axis by 90° with respect to said outer joint part axis;

thereafter, receiving a land of said outer joint part in a forward region of a cage window;

thereafter, rotating said cage towards said outer joint part such that an outer joint part land opposing said received land is received in a corresponding opposing cage window;

thereafter, translating said cage toward said outer joint part along said outer joint part axis; and rotating said ball cage about a transverse axis by 90° with respect to said outer joint part axis.

* * * * *